United States Patent

Jüstel et al.

Patent Number: 6,133,688
Date of Patent: Oct. 17, 2000

[54] LUMINESCENT MATERIAL

[75] Inventors: Thomas Jüstel, Aachen; Carolin Borgmann, Frankfurt; Ferdinand Schüth, Oberursel, all of Germany

[73] Assignee: U.S. Phillips Corporation, New York, N.Y.

[21] Appl. No.: 09/088,719

[22] Filed: Jun. 1, 1998

[30] Foreign Application Priority Data

Jun. 3, 1997 [EP] European Pat. Off. ............ 97201665

[51] Int. Cl.⁷ .................................................. H01J 1/62
[52] U.S. Cl. ........................ 313/486; 313/468; 252/301.5
[58] Field of Search ................... 313/486, 483, 313/467, 468, 503; 252/301.4 R, 301.4 H, 301.5

[56] References Cited

U.S. PATENT DOCUMENTS 3,937,998  2/1976  Verstegen et al. ................ 313/487
5,900,695  5/1999  Kynast et al. ..................... 313/486

FOREIGN PATENT DOCUMENTS

WO9729165  8/1997  WIPO .

*Primary Examiner*—Michael H. Day
*Assistant Examiner*—Joseph Williams
*Attorney, Agent, or Firm*—F. Brice Faller

[57] ABSTRACT

A luminescent material of general formula $$Ln_{y/3}Na_{x-y}(Al_xSi_{192-x}O_{384})(MO_3)_z$$

wherein $0<x<96$, $0<y<96$, $y<x$ and $z<20$, and Ln comprises one or more elements chosen from the group formed by Sc, Y, La and the Lanthanides and wherein M comprises one or more elements chosen from the group formed by Mo, W, V, Nb and Ta. Luminescent materials of this general formula are relatively cheap and are very suitable for use in low pressure mercury discharge lamps of the three band type.

11 Claims, No Drawings

LUMINESCENT MATERIAL

BACKGROUND OF THE INVENTION

The invention relates to a luminescent material, a luminescent screen and a low pressure mercury lamp comprising such a luminescent screen. The invention also relates to a method for preparing the luminescent material.

Modern low pressure mercury discharge lamps are often equipped with a luminescent screen of the so called three band type. The luminescent screen of such a low pressure mercury discharge lamp comprises three luminescent materials, each of which has a relatively narrow emission band. These emission bands are in the blue, green and red region of the visible spectrum respectively. Such low pressure mercury discharge lamps are described for instance in Netherlands patent 164,697, which corresponds to U.S. Pat. No. 3,397,998. These lamps have a relative high efficacy and a good colour rendering. The luminescent materials that are used in these lamps generally consist of a host lattice activated with ions of an element chosen from the lanthanides. The emission bands of trivalent lanthanide ions is relatively narrow and more in particular the emission bands of $Tb^{3+}$ and $Eu^{3+}$ are in such a region of the visible spectrum that the lumen/Watt ratio is very favourable. For instance, since the market introduction of low pressure mercury discharge lamps of the three band type, the luminescent material with the emission band in the red region of the visible spectrum that has been used by virtually all manufacturers is yttrium oxide activated with trivalent europium. This luminescent material has a high absorption and a high quantum yield. Additionally the degradation is relatively low. An important disadvantage of this luminescent material, however, is that yttrium oxide is very expensive, the more so since it is often present in the luminescent screen in a relatively large quantity (e.g. 60% by weight).

SUMMARY OF THE INVENTION

The invention aims to provide relatively cheap luminescent materials suitable for use in the luminescent screen of a low pressure mercury discharge lamp of the three band type.

A luminescent material according to the invention is of general formula

$$Ln_{y/3}Na_{x-y}(Al_xSi_{192-x}O_{384})(MO_3)_z$$

wherein $0<x<96$, $0<y<96$, $y<x$ and $z<20$, and Ln comprises one or more elements chosen from the group formed by Sc, Y, La and the Lanthanides and wherein M comprises one or more elements chosen from the group formed by Mo, W, V, Nb and Ta.

A luminescent material according to the invention is relatively inexpensive because they can be prepared by means of a relatively simple method using starting materials most of which are relatively inexpensive. It has been found that the luminescent materials according to the invention are particularly suitable for use in a luminescent screen. Such a luminescent screen is very suitable for use in for instance a low pressure mercury discharge lamp, more in particular a low pressure mercury discharge lamp of the three band type.

Good results have been obtained for luminescent materials according to the invention wherein Ln comprises Eu. The Eu is present in the luminescent material in its trivalent state. These luminescent materials mainly emit in the red region of the visible spectrum and are therefore suitable to replace yttrium oxide activated with trivalent europium in a low pressure mercury lamp of the three band type. Additionally it has been found that a relatively high quantum efficiency can be realized in case Ln apart from Eu also comprises one or more of elements of the group formed by Gd and Y.

In case Ln comprises Tb, luminescent materials that emit mainly in the green region of the visible spectrum can be obtained.

In case Ln comprises one or more of the elements Tm, Ce and Pr, luminescent materials that emit mainly in the blue region of the visible spectrum can be obtained.

It has been found that luminescent materials according to the present invention can be prepared in a relatively simple and inexpensive way when use is made of a method comprising the following steps:

immersion of a porous mixed oxide of Al and Si into a watery solution of a salt of Ln, isolation of the resulting crystals, heating a mixture of the resulting crystals with a solid compound comprising M in the presence of a gas mixture comprising oxygen, allowing the resulting product to cool down, and heating the resulting product in the presence of a gas mixture comprising oxygen.

During the second heat treatment the temperature is chosen so that the porous structure of the mixed oxide collapses.

Good results have been obtained in case the mixed oxide is a zeolite, preferably chosen from the group formed by zeolite X, zeolite Y and ZSM-5. Good results have also been obtained for methods wherein use was made of an ammonium metallate or a metal oxide as the solid compound comprising M.

DETAILED DESCRIPTION OF THE PREFERRED EMBODIMENTS

The following is a typical example of the preparation of a luminescent material according to the invention.

0.7 gram of a zeolite of formula $Na_{86.9}(Al_{86.9}Si_{105.1}O_{384})$ was suspended in 25 ml of a solution containing 0.002–0.04 moles of $EuCl_3.H_2O$ per liter. The suspension was stirred at room temperature for 6 hours. The reaction product was isolated by means of filtration, washed with distilled water and dried at 70° C.

300 milligram of reacted zeolite was thoroughly mixed with 60 mg of $MoO_3$ for 15 minutes. A thin layer of the mixture was calcined in an oven in the presence of air. The applied rate of heating was 1° C./minute and the maximum temperature of 500° C. was maintained for 8 hours. After cooling down to 200° C. the product was removed from the oven.

The product was subsequently given a second heat treatment by applying a rate of heating of 1° C./minute and the maximum temperature of 1000° C. was maintained for 2 hours in the presence of air. After cooling down the resulting powder was removed from the oven. The formula of the obtained luminescent material was $Eu_{17}Na_{34.9}(Al_{85.9}Si_{106.1})O_{384}(MoO_3)_{9.7}$. Its properties were as follows. The absorption of UV radiation with a wavelength of 254 nm was 95%. When the luminescent material was excited by radiation of 254 nm, the quantum efficiency was 20%. The emission spectrum showed emission peaks at 590, 613 and 615 nm. The lumen equivalent of the emission spectrum was 283 lm/W. The colour coordinates of the emitted light were x=0.643 and y=0.353.

It is remarked that to obtain luminescent materials comprising apart from Eu also Gd and/or Y, use can be made of a solution also containing $Gd(NO_3)_3.6H_2O$ and/or $Y(NO_3)_3.6H_2O$ in addition to $EuCl_3.H_2O$. Alternatively this can be achieved by suspending the zeolite subsequently in solutions comprising different salts.

A luminescent material of formula $Eu_{8.5}Gd_{8.5}Na_{34.9}(Al_{85.9}Si_{106.1})O_{384}(MoO_3)_{9.7}$ was prepared by suspending a zeolite of the same formula as the one used in the preparation described hereabove in a solution containing equal amounts of $Gd(NO_3)_3.6H_2O$ and $EuCl_3.H_2O$. The suspension was stirred for 6 hours at room temperature and the further preparation was identical to the one described hereabove.

The properties of the obtained luminescent material were as follows. The absorption of UV radiation with a wavelength of 254 nm was 94%. When the luminescent material was excited by radiation of 254 nm, the quantum efficiency was 28%. The emission spectrum showed emission peaks at 590, 613 and 626 nm. The lumen equivalent of the emission spectrum was 247 lm/W. The colour coordinates of the emitted light were x=0.656 and y=0.339. It can be seen that the quantum efficiency of the luminescent material of formula $Eu_{8.5}Gd_{8.5}Na_{34.9}(Al_{85.9}Si_{106.1})O_{384}(MoO_3)_{9.7}$ is significantly higher than the quantum efficiency of $Eu_{17}Na_{34.9}(Al_{85.9}Si_{106.1})O_{384}(MoO_3)_{9.7}$ while the other properties are roughly the same.

The green luminescing substance $Tb_{17}Na_{34.9}(Al_{85.9}Si_{106.1})O_{384}(MoO_3)_{9.7}$ was prepared by suspending a zeolite of formula $Na_{86.9}(AL_{86.9}Si_{105.1}O_{384})$ in 25 ml of a solution containing 0.04 moles of $TbCl_3.H_2O$ per liter. The remaining steps of the preparation were identical to those in the preparations described hereabove. The properties of the obtained luminescent material were as follows. The absorption of UV radiation with a wavelength of 254 nm was 96%. When the luminescent material was excited by radiation of 254 nm, the quantum efficiency was 9%. The emission spectrum showed an emission peaks at 545 nm. The lumen equivalent of the emission spectrum was 465 lm/W. The colour coordinates of the emitted light were x=0.339 and y=0.562.

What is claimed is:

1. Luminescent material of general formula

Lny/3Nax-y(AlxSi192-xO384)(MO3)z wherein 0<x<96, 0<y<96, y<x and z<20, and Ln comprises at least one element from the group formed by Sc, Y, La and the Lanthanides, and at least one element from the group formed by Gd and Y, and wherein M comprises at least one element from the group formed by Mo, W, V, Nb and Ta.

2. Luminescent material according to claim 1, wherein Ln comprises Eu.

3. Luminescent material according to claim 1, wherein Ln comprises Tb.

4. Luminescent material according to claim 1, wherein Ln comprises one or more of the elements Tm, Ce and Pr.

5. Luminescent screen comprising a bearer provided with a luminescent material as claimed in claim 1.

6. Low pressure mercury discharge lamp provided with a luminescent screen as claimed in claim 5.

7. Method for preparing a luminescent material of the general formula $Ln_{y/3}Na_{x-y}(Al_xSi_{192-x}O_{384})(MO_3)_z$ wherein 0<x<96, 0<y<96, y<x and z<20, and Ln comprises at least one element from the group formed by Sc, Y, La and the Lanthanides, and at least one element from the group formed by Gd and Y and wherein M comprises one or more elements chosen from the group formed by Mo, W, V, Nb and Ta, said method comprising the following steps:

suspending a porous mixed oxide of Al and Si into a watery solution of a salt of Ln until crystals are formed, isolating the crystals, heating a mixture of the crystals with a solid compound comprising M in the presence of a gas mixture comprising oxygen until a product results, cooling the resulting product, and heating the resulting product in the presence of a gas mixture comprising oxygen.

8. Method according to claim 5, wherein the porous mixed oxide is a zeolite, preferably chosen from the group formed by zeolite X, zeolite Y and ZSM-5.

9. Method according to claim 5, wherein the solid compound comprising M comprises an ammonium metallate or a metal oxide.

10. Luminescent material of the general formula

Lny/3Nax-y(AlxSi192-xO384)(MO3)z wherein 0<x<96, 0<y<96, y<x and z<20, and Ln comprises at least one element from the group formed by Sc, Y, La and the Lanthanides, at least one element from the group formed by Tm, Ce, and Pr.

11. Luminescent screen comprising a bearer provided with a luminescent material of the general formula Lny/3Nax-y(AlxSi192-xO384)(MO3)z wherein M is a solid compound comprising one of an ammonium metallate and a metal oxide.

* * * * *